US012620804B2

(12) United States Patent
Arnould

(10) Patent No.: US 12,620,804 B2
(45) Date of Patent: May 5, 2026

(54) POWER MANAGEMENT IN A NEAR FIELD COMMUNICATION CONTROLLER

(71) Applicant: STMicroelectronics (Alps) SAS, Grenoble (FR)

(72) Inventor: Patrick Arnould, Voreppe (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 285 days.

(21) Appl. No.: 18/490,809

(22) Filed: Oct. 20, 2023

(65) Prior Publication Data

US 2024/0136814 A1    Apr. 25, 2024

(30) Foreign Application Priority Data

Oct. 24, 2022    (FR) ....................................... 2210986

(51) Int. Cl.
| | |
|---|---|
| *H02J 1/08* | (2026.01) |
| *G06F 1/26* | (2006.01) |
| *H04W 52/00* | (2009.01) |

(52) U.S. Cl.
CPC .............. *H02J 1/086* (2020.01); *G06F 1/266* (2013.01); *H04W 52/00* (2013.01)

(58) Field of Classification Search
CPC .......... H02J 1/086; G06F 1/266; H04W 52/00
See application file for complete search history.

(56) References Cited

U.S. PATENT DOCUMENTS

| | | | |
|---|---|---|---|
| 2009/0150704 A1 | 6/2009 | Van Bosch | |
| 2014/0141844 A1 | 5/2014 | Golla et al. | |
| 2018/0059757 A1* | 3/2018 | Ananthakrishnan | ......................... G06F 1/3296 |

FOREIGN PATENT DOCUMENTS

| | | | | |
|---|---|---|---|---|
| CN | 103493079 A | * | 1/2014 | ......... G06Q 20/3226 |
| CN | 117806471 A | * | 4/2024 | ............. G06F 1/266 |
| EP | 3547557 A1 | | 10/2019 | |

* cited by examiner

*Primary Examiner* — David Bilodeau
(74) *Attorney, Agent, or Firm* — Slater Matsil, LLP

(57) ABSTRACT

A near field communication controller integrated circuit includes a power management circuit configured to retransmit an external supply voltage from at least one power supply input node to at least one power supply output node in a bypass power supply mode. The power management circuit is hardware configured to automatically enable the bypass power supply mode in response to the external supply voltage being present at the at least one power supply input node.

20 Claims, 4 Drawing Sheets

[Fig. 1]
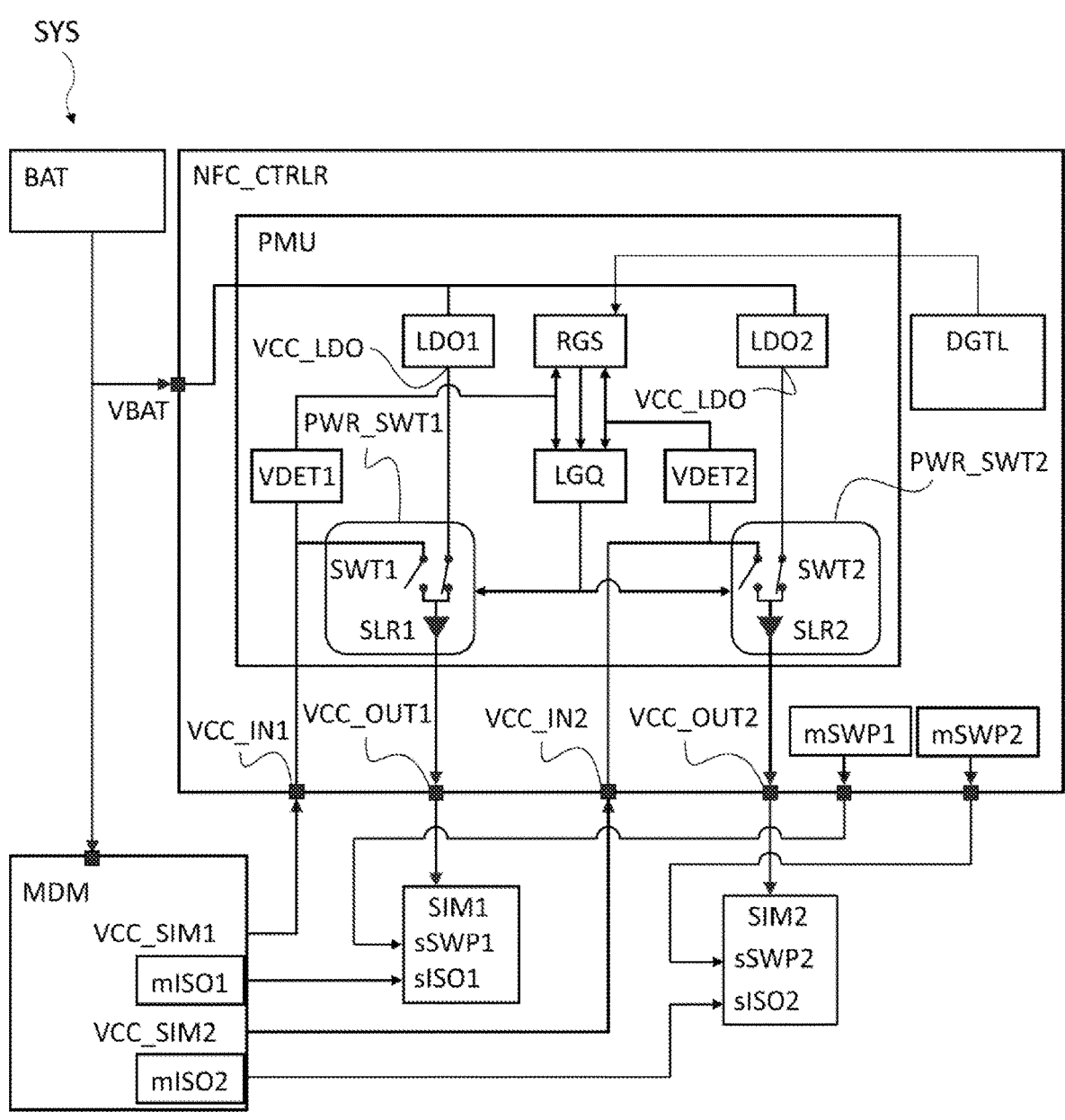

[Fig. 2]

[Fig. 3]
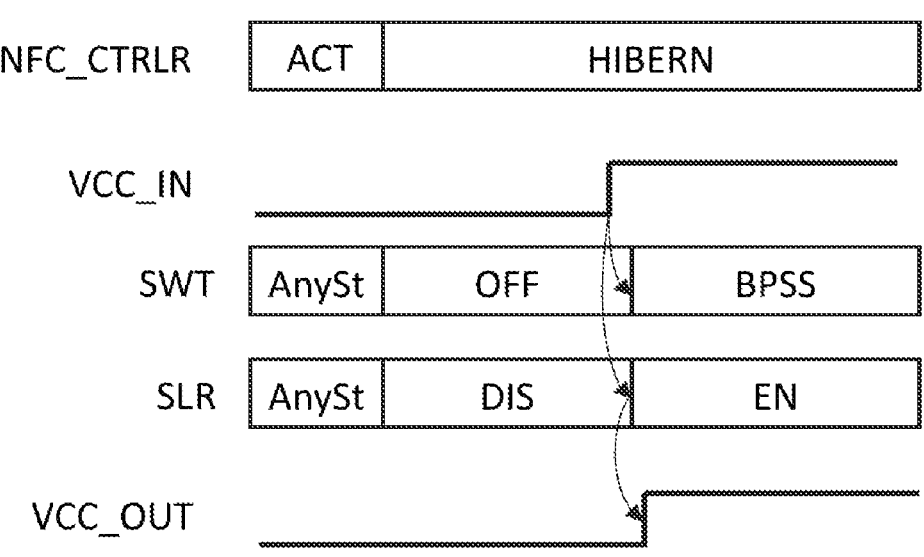
[Fig. 4]
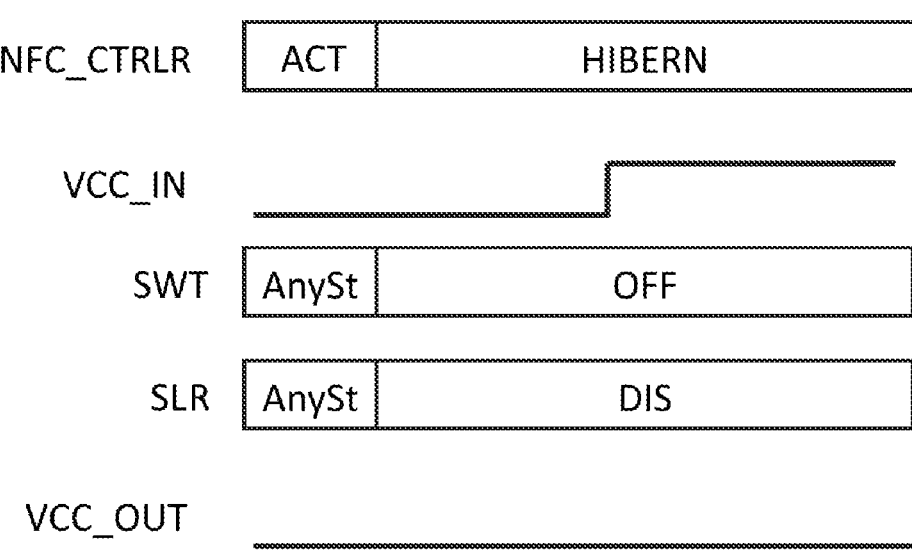

[Fig. 5]
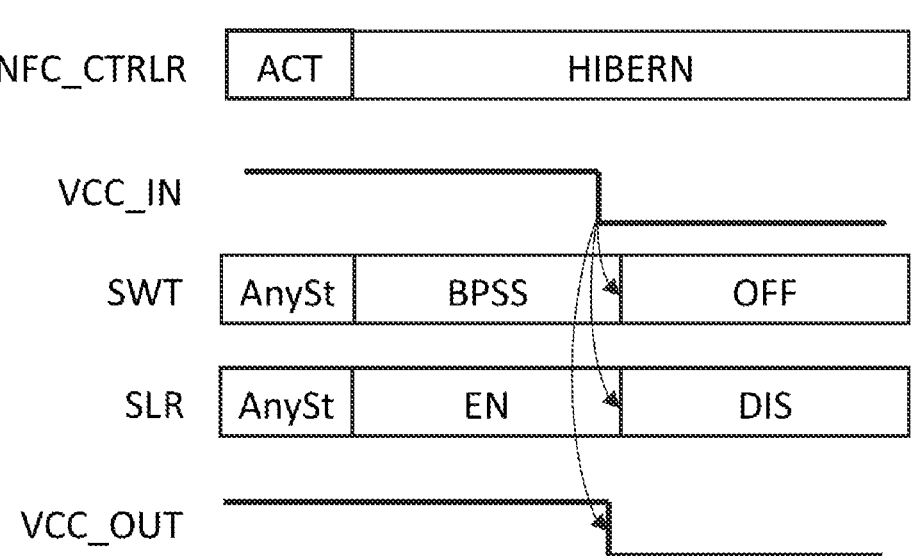

POWER MANAGEMENT IN A NEAR FIELD COMMUNICATION CONTROLLER

CROSS-REFERENCE TO RELATED APPLICATIONS

This application claims the benefit of French Patent Application No. 2210986, filed on Oct. 24, 2022, which application is hereby incorporated herein by reference.

TECHNICAL FIELD

Embodiments and implementations relate to the management of the power supply in a near field communication (NFC) controller. Embodiments and implementations relate in particular to the management of the power supply of the security peripherals that may be used by the NFC controller and also by another telecommunications control device.

BACKGROUND

Near field communication (NFC) makes a contactless communication possible over a short distance, for example 10 cm, between a reader and a transponder, by modulation and back-modulation of the amplitude of a carrier wave at 13.56 MHz. NFC technology is an open technology platform, standardized in particular in the standard ISO-14443.

NFC communications may be implemented between two peer-to-peer communication devices, such as multifunction telephones (usually referred to as "smartphone"); or also between a reader device and a transponder device, such as a RFID or NFC or tag or card or a multifunction telephone in card-emulation mode.

Security peripherals, for example Subscriber Identification Modules (SIM), provide a security service typically shared between various applications, particularly NFC communications and other telecommunications, for example of the Long Term Evolution (LTE) type telephony or data rate particularly incorporating the 4th generation (4G) and 5th generation (5G) telephony standards or others.

On the one hand, for example when the telephone emulates a card mode, the security peripherals may also be used by the NFC controller for NFC applications (for example, travel card, travel document, etc.) even if the telephone is switched off or in a mode where the telecommunications functionalities are disabled (usually called "airplane mode" for example).

On the other hand, reciprocally, if the NFC controller is disabled, for example in an energy saving mode or forced to an off state, the security peripherals may be used for the other telecommunications (for example the telephony).

The fact of providing these two functionalities typically presents difficulties in the management of the power supply of the security peripherals.

In particular, when the management of the power supply of the security peripherals is implemented by the NFC controller, the use of the security peripherals conventionally leads to a "wake-up" of the NFC controller by interruption signals, that is to say an exit from the energy saving mode, to establish the power supply of the peripherals by software commands, then a return to the energy saving mode.

The boot processes during wake-ups of the NFC controller lead to unnecessary energy consumptions and possibly also a latency before the effective establishment of the power supply of the peripherals.

Moreover, if the NFC controller is forced in the off state, the wake-up of the controller for managing the power supply of the peripherals is conventionally impossible. Consequently, the conventional NFC controllers implementing the management of the power supply of the peripherals may not benefit from the functionality of being forced in the off state.

SUMMARY

In various embodiments, the present disclosure provides a hardware configuration of a NFC controller that at least partially overcomes the drawbacks of conventional NFC controllers, for example, by performing the management of the power supply of the peripherals, automatically and independently of the operating mode of the controller.

Particular embodiments and implementations provide a power supply of the peripherals by an external supply voltage provided in bypass by the NFC controller.

In at least one embodiment, an integrated circuit is provided that includes a near field communication controller including a power management circuit configured to retransmit an external supply voltage from at least one power supply input node to at least one power supply output node in a bypass power supply mode. The power management circuit is hardware configured to automatically enable the bypass power supply mode in response to the external supply voltage being present at the at least one power supply input node.

"Hardware configured" means that the circuit is manufactured to implement the corresponding function, and in particular, that the corresponding function is not from a software execution of a program.

According to at least one embodiment, the power management circuit includes at least one voltage detection circuit hardware configured to detect the presence of the external supply voltage at the at least one power supply input node.

According to at least one embodiment, the power management circuit includes a logic circuit hardware configured to automatically enable the bypass power supply mode, based on the presence of the external supply voltage, and based on at least one configuration data contained in a configuration register of the power management circuit.

According to at least one embodiment, the power management circuit includes at least one slew rate limiter configured to limit a current on the at least one power supply output node, and the power management circuit is configured to control a start-up of the slew rate limiter in the bypass power supply mode.

The slew rate limiter particularly makes it possible to prevent the risk of degradation caused by a current draw on the power supply output node.

According to at least one embodiment, the power management circuit is hardware configured to operate independently and automatically in a low power mode of the near field communication controller.

According to at least one embodiment, the power management circuit further includes at least one voltage generator configured to generate an internal supply voltage on the at least one power supply output node, in an autonomous power supply mode.

In at least one embodiment, a system is provided that includes a near field communication controller integrated circuit, a telecommunications control circuit, and a security peripheral device. The near field communication controller integrated circuit includes a power management circuit configured to retransmit an external supply voltage from a power supply input node to a power supply output node in a bypass power supply mode. The power management circuit is configured to automatically enable the bypass power supply mode in response to the external supply voltage being present at the power supply input node. The telecommunications control circuit is configured to provide the external supply voltage to the power supply input node of the near field communication controller. The security peripheral device is configured to be powered on by a voltage at the power supply output node of the near field communication controller.

In at least one embodiment, a method is provided that includes: retransmitting, by a power management circuit of a near field communication controller integrated circuit, an external supply voltage from a supply input node to a supply output node in a bypass power supply mode; and automatically enabling the bypass power supply mode, by the power management circuit, in response to the external supply voltage being present at the power supply input node.

According to at least one embodiment, the method comprises detecting the presence of the external supply voltage at the power supply input node, by a voltage detection circuit.

According to at least one embodiment, the automatic enabling of the bypass power supply mode is based on the presence of the external supply voltage at the power supply input node, and based on configuration data stored in a configuration register of the power management circuit.

According to at least one embodiment, the automatic enabling of the bypass power supply mode comprises limiting, by a slew rate limiter, a current at the power supply output node.

Advantageously, the method is implemented independently and automatically in a low power mode of the near field communication controller.

According to at least one embodiment, the method further comprises generating an internal supply voltage at the power supply output node in an autonomous power supply mode.

According to at least one embodiment, the method further includes: providing the external supply voltage to the supply input node by a telecommunications control circuit; and powering on a security peripheral powered device by the near field communication controller by a voltage at the supply output node.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic diagram illustrating an electronic system, in accordance with one or more embodiments;

FIG. 2 is a schematic diagram illustrating details of a logic circuit which may be included in power management circuit, in accordance with one or more embodiments;

FIG. 3 is a timing diagram illustrating switching from an active mode to a low power mode of a near field communications controller;

FIG. 4 is a timing diagram illustrating switching from an active mode to a low power mode of a near field communications controller, when an automatic bypass power supply mode is disabled; and FIG. 5 is a timing diagram illustrating switching from an active mode to a low power mode of a near field communications controller when the near field communications controller is already in the bypass power supply mode.

DETAILED DESCRIPTION OF ILLUSTRATIVE EMBODIMENTS

FIG. 1 illustrates an example of electronic system SYS, such as a multifunction mobile phone.

The electronic system SYS incorporates a near field communication controller NFC_CTRLR integrated circuit, as well as for example a telecommunications control circuit MDM (which may be referred to herein as a telecommunications control unit) usually called "modem", at least one security peripheral SIM1, SIM2, as well as a power supply BAT, for example a battery, providing the energy of the system and particularly a supply voltage of the system VBAT.

The security peripherals SIM1, SIM2, such as for example subscriber identification modules, may be used by the near field communication controller NFC_CTRLR and by the modem MDM.

For example, the modem MDM is configured to communicate with the security peripherals SIM1, SIM2 via a bus, for example a bus defined by the standard "ISO 7816" relating to electronic identification cards equipped with contacts. The "ISO 7816" bus for example makes the connection, respectively for each peripheral SIM1, SIM2, between a master interface mISO1, mISO2 of the modem MDM and a slave interface sISO1, sISO2 of the security peripheral SIM1, SIM2.

For example, the controller NFC_CTRLR is configured to communicate with the security peripherals SIM1, SIM2 via a bus, for example a Single Wire Protocol (SWP) (that is to say a communication protocol on a single wire connection, in particular dedicated to communications between "SIM" cards and "NFC" controllers) type bus. The "SWP" bus makes the connection, respectively for each peripheral SIM1, SIM2, between a master interface mSWP1, mSWP2 of the controller NFC_CTRLR and a slave interface sSWP1, sSWP2 of the security peripheral SIM1, SIM2.

The security peripherals SIM1, SIM2 are configured to be powered, that is to say receive a supply voltage, on at least one power supply output node VCC_OUT1, VCC_OUT2 of the near field communication controller NFC_CTRLR.

The controller NFC_CTRLR is configured to perform the management of the power supply of the security peripherals SIM1, SIM2, and includes in this respect a power management circuit (which may be referred to herein as a power management unit) PMU.

The power management unit PMU is configured to provide a supply voltage on the power supply output nodes VCC_OUT1, VCC_OUT2, in a bypass power supply mode BPSS in particular, and for example furthermore in an autonomous power supply mode.

In the autonomous power supply mode, at least one voltage generator LDO1, LDO2, incorporated into the power management unit PMU, is configured to generate an internal supply voltage VCC_LDO on said at least one power supply output node VCC_OUT1, VCC_OUT2. The voltage generator LDO1, LDO2 may be a circuit of the low dropout regulator type, capable of regulating the supply voltage of the system VBAT at a level adapted to the peripherals SIM1, SIM2.

In the bypass power supply mode BPSS, the power management unit PMU is adapted to receive at least one external supply voltage VCC_SIM1, VCC_SIM2, on at least one respective power supply input node VCC_IN1, VCC_IN2, and retransmit the external supply voltage VCC_SIM1, VCC_SIM2 to at least one power supply output node VCC_OUT1, VCC_OUT2.

Furthermore, the power management unit PMU is hardware configured to automatically enable the bypass power supply mode BPSS, if said at least one external supply voltage VCC_SIM1, VCC_SIM2 is present on the respective power supply input node VCC_IN1, VCC_IN2.

The power management unit PMU is advantageously hardware configured in such a way as to be able to operate autonomously, and particularly independently of the state or of the operating mode of the controller NFC_CTRLR.

The power management unit PMU is for example configured to operate automatically, even in a low power mode HIBERN of the near field communication controller NFC_CTRLR. The low power mode HIBERN may for example be a "very low power" mode, or according to the denominations a "sleep" or "hibernation" mode, or even also a forced stop mode of the near field communication controller NFC_CTRLR.

For example, said at least one external supply voltage VCC_SIM1, VCC_SIM2 is generated by the telecommunications control unit MDM, plugged into said at least one power supply input node VCC_IN1, VCC_IN2 of the controller NFC_CTRLR in view of powering the security peripheral(s) SIM1, SIM2 in the bypass power supply mode BPSS of said controller NFC_CTRLR.

It will be noted that the activity, the operating mode, and the use of the services of the security peripherals SIM1, SIM2, relating to the telecommunications control unit MDM are independent of the state and of the operating mode of the near field communication controller NFC_CTRLR.

The power management unit PMU may include a voltage detection circuit VDET1, VDET2, on each power supply input node, hardware configured to detect the presence of the external supply voltage VCC_SIM1, VCC_SIM2 on the respective power supply input node VCC_IN1, VCC_IN2.

The voltage detection circuit VDET1, VDET2 is configured to generate a detection signal that may have the logic levels "1" or "0", transmitted to a logic circuit LGQ. The levels of the detection signal are respectively representative of the presence or of the absence of the external supply voltage signal VCC_SIM1, VCC_SIM2 on the respective node VCC_IN1, VCC_IN2.

The logic circuit LGQ of the power management unit PMU is hardware configured to automatically enable the bypass power supply mode BPSS, on the one hand in a manner conditioned by said presence of the external supply voltage VCC_SIM1, VCC_SIM2, communicated by the detection signal of the respective voltage detector VDET1, VDET2.

The bypass power supply mode BPSS, may be on the one hand enabled in a manner conditioned by at least one configuration data BPSS_AUTO_EN_LTCHD contained in a configuration register RGS.

The configuration data BPSS_AUTO_EN_LTCHD may correspond to a command to enable or disable the functionality for automatically enabling the bypass power supply mode BPSS.

The configuration register RGS is for example intended to be written by a command coming from a digital central unit DGTL, for example by a command from a software execution of a microprogram of the controller NFC_CTRLR.

Finally, the power management unit PMU includes a power supply switching stage PWR_SWT1, PWR_SWT2, for respectively each power supply output node VCC_OUT1, VCC_OUT2.

On the one hand, each power supply switching stage PWR_SWT1, PWR_SWT2 includes a switch circuit SWT1, SWT2 configured to route on the respective output node VCC_OUT1, VCC_OUT2, either the internal supply voltage VCC_LDO coming from the respective voltage generator LDO1, LDO2, in the autonomous power supply mode, or the external supply voltage VCC_SIM1, VCC_SIM2 coming from the respective power supply input node VCC_IN1, VCC_IN2, in the bypass power supply mode BPSS.

On the other hand, each power supply switching stage PWR_SWT1, PWR_SWT2 may include a slew rate limiter SLR1, SLR2, configured to limit the amount of current that may flow on said at least one power supply output node VCC_OUT1, VCC_OUT2.

Thus, during the automatic enabling of the bypass power supply mode BPSS, the power management unit PMU controls the switch circuit SWT1, SWT2 in the corresponding position, and controls a start-up of the slew rate limiter SLR1, SLR2.

The start-up of the slew rate limiter SLR1, SLR2 may itself also be conditioned by a configuration data SLR_AUTO_EN_LTCHD contained in the configuration register RGS. Thus, the configuration data SLR_AUTO_EN_LTCHD may correspond to a command to enable or disable the automatic start-up functionality of the slew rate limiter(s) SLR1, SLR2.

The slew rate limiter SLR1, SLR2 makes it possible particularly to prevent the risk that there is a current draw that is too high on the corresponding power supply output node VCC_OUT1, VCC_OUT2, connected to the security peripherals SIM1, SIM2, for example during the application of the supply voltage VCC_SIM1, VCC_SIM2 or VCC_LDO to retransmit on the power supply output node VCC_OUT1, VCC_OUT2.

Figure 2:
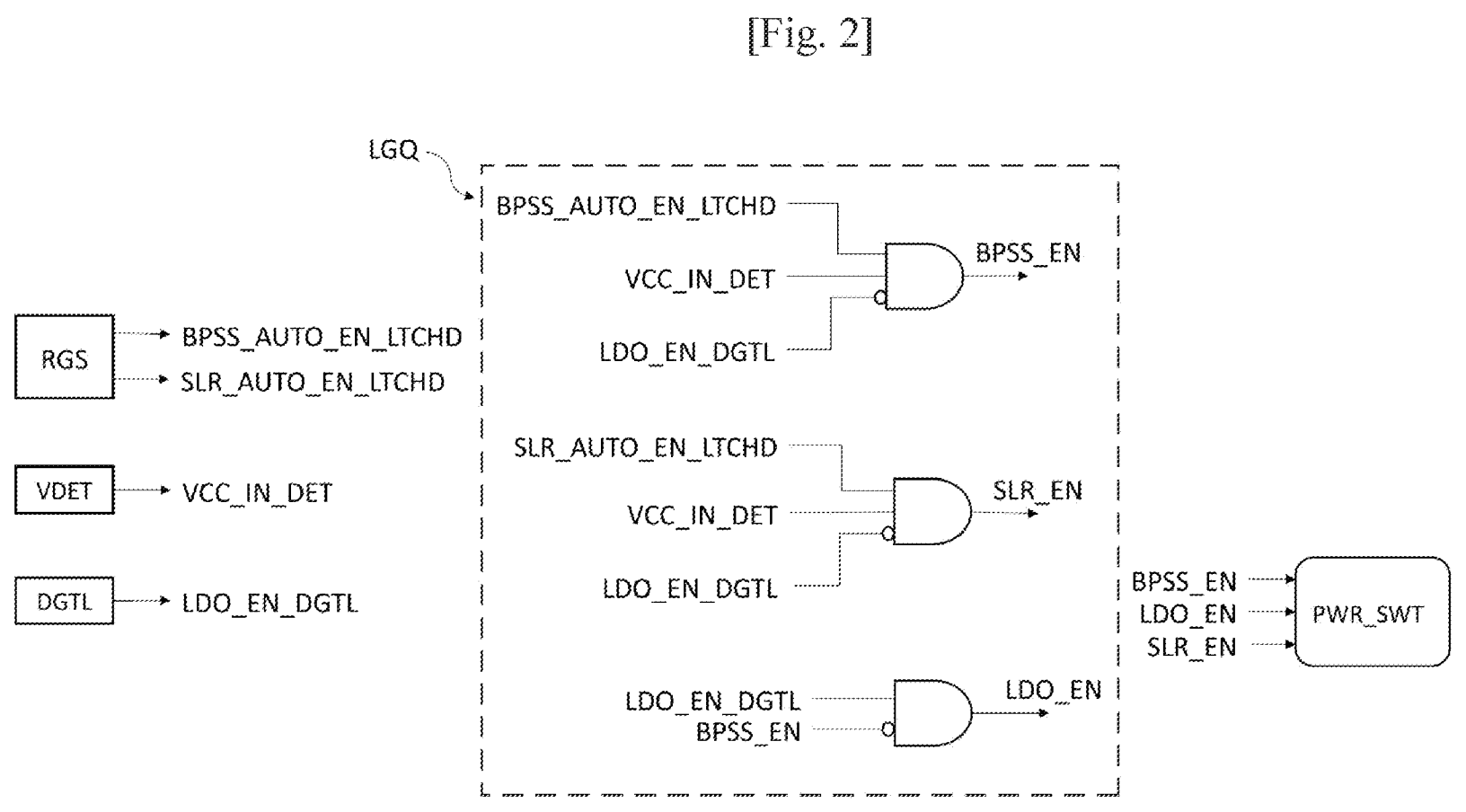

FIG. 2 illustrates a basic example of hardware configuration of the logic circuit LGQ for the abovementioned automatic functionalities; that is to say the functionalities for automatically enabling the bypass power supply mode BPSS and automatically starting the slew rate limiter(s) SLR1, SLR2.

The logic circuit LGQ may for example operate in a way conditioned by the configuration data BPSS_AUTO_EN_LTCHD, SLR_AUTO_EN_LTCHD contained in the configuration register RGS; by the digital detection signal VCC_IN_DET generated by the voltage detection circuit VDET; and by a digital signal for controlling the autonomous power supply mode LDO_EN_DGTL generated by the digital central unit DGTL of the near field communication controller NFC_CTRLR.

The logic circuit LGQ is for example configured to generate a switching control signal BPSS_EN, of which the logic value "1" controls the corresponding switch circuit SWT1, SWT2 in the position of the bypass power supply mode.

The switching control signal BPSS_EN is generated by the triple condition: BPSS_AUTO_EN_LTCHD and VCC_IN_DET and not-LDO_EN_DGTL, with "and" and "not" the conventional and known per se Boolean logic operators.

In other words, the switching control signal BPSS_EN is automatically generated at "1" in the event of detection of the presence of the external supply voltage VCC_IN_DET=1, provided that this functionality is enabled with BPSS_AUTO_EN_LTCHD=1 and that the autonomous power supply mode is not controlled by the central unit LDO_EN_DGTL=0.

The logic circuit LGQ is for example configured to generate a start-up control signal SLR_EN, of which the logic value "1" controls the start-up of the slew rate limiters SLR1, SLR2.

The start-up control signal SLR_EN is generated by the triple condition: SLR_AUTO_EN_LTCHD and VCC_IN-_DET and not-LDO_EN_DGTL, with "and" and "not" the conventional and known per se Boolean logic operators.

In other words, the start-up control signal SLR_EN is automatically generated at "1" in the event of detection of the presence of the external supply voltage VCC_IN-_DET=1, provided that this functionality is enabled with SLR_AUTO_EN_LTCHD=1 and that the autonomous power supply mode is not controlled by the central unit LDO_EN_DGTL=0.

The logic circuit LGQ is for example configured to generate a second switching control signal LDO_EN, of which the logic value "1" controls the switch circuits SWT1, SWT2 in the position of the autonomous power supply mode.

The second switching control signal LDO_EN is generated by the condition: LDO_EN_DGTL and not-BPSS_EN, with "and" and "not" the conventional and known per se Boolean logic operators.

In other words, the second switching control signal LDO_EN is automatically generated at "1" in the event of control of the autonomous power supply mode by the central unit LDO_EN_DGTL=0, provided that the switching control signal BPSS_EN is not generated at "1".

Thus, the logic circuit LGQ may provide a mechanism hardware configured to prevent a transient control of the switch circuits SWT1, SWT2, simultaneously in the position of the autonomous power supply mode and in the position of the bypass power supply mode (that is to say, in the drawing of FIG. 1, a control of two closed switches, connecting together the input node VCC_IN1/VCC_IN2 and the output of voltage generator LDO1/LDO2).

FIGS. 3, 4 and 5 illustrate examples of implementations and advantages of the method for managing the power supply performed by the near field communication controller NFC_CTRLR integrated circuit described above in relation with FIGS. 1 and 2.

FIGS. 3, 4 and 5 show, as a function of time horizontally:

the operating mode or the state ACT, HIBERN wherein the controller NFC_CTRLR may be;

the signal VCC_IN present on the power supply input node VCC_IN1, VCC_IN2 arbitrarily selected;

the position AnySt, OFF, BPSS, of the switch circuit SWT corresponding to this input node;

the operating state AnySt, DIS, EN, of the slew rate limiter SLR corresponding to this input node;

the signal VCC_OUT retransmitted on the power supply output node VCC_OUT1, VCC_OUT2 corresponding to this input node.

FIG. 3 illustrates a case where the controller NFC_CTRLR is removed from an active mode ACT to enter a low power mode HIBERN.

In the active mode ACT, the controller NFC_CTRLR is for example controlled in a software manner by the digital central unit DGTL, and is capable of providing the power supply on the power supply output node VCC_OUT in the autonomous power supply mode, or not providing the power supply, or providing the power supply in the bypass power supply mode. The switch circuit PWT and the corresponding slew rate limiter SLR may be in any state AnySt, for example controlled by the digital central unit DGTL.

In the low power mode HIBERN, for example called "very low power" mode, or also "sleep" or "hibernation" mode, and or even also a forced stop mode, the controller NFC_CTRLR targets a minimal current consumption, for example in the order of 2 µA to 3 µA (microampere).

In this respect, the software implementation of the digital central unit DGTL is stopped, the switch circuit SWT is controlled in an off position OFF wherein the power supply output node VCC_OUT is connected to the earth or optionally placed at a high-impedance floating potential, and the slew rate limiter SLR is disabled DIS.

It will be noted that the consumption, during activity, of the slew rate limiter SLR, for example in the order of 10 µA (microampere), is in itself greater than the consumption target in the low power mode HIBERN.

If, in the low power mode HIBERN, the external supply voltage is applied on the power supply input node VCC_IN, then the bypass power supply mode is enabled automatically, positioning the switch circuit SWT in the bypass power supply position BPSS, and the slew rate limiter SLR is enabled EN.

Thus, the power supply input node VCC_IN is coupled to the power supply output node VCC_OUT, and the external supply voltage VCC_IN is retransmitted in the power supply output voltage VCC_OUT.

It will be noted that the reaction of the controller NFC_CTRLR in the presence of the external voltage on the power supply input node VCC_IN is carried out automatically, in a hardware manner, and in particular without commands from the software execution of a program by the digital central unit DGTL.

Thus, it is not necessary to pass by an active state ACT of the controller NFC_CTRLR, after a boot phase, to control the configuration of the bypass power supply mode.

This makes it possible not only to benefit from a faster reaction time in the management of the power supply to enable the bypass mode, but also to prevent the energy consumption of the active mode ACT.

FIG. 4 illustrates the same case as that of FIG. 3, but in a setting where the functionality for automatically enabling the bypass power supply mode is disabled, for example by saving the configuration data BPSS_AUTO_EN_LTCHD (or even previously in relation with FIG. 2) at the disabled value "0" in the configuration register RGS.

If, in this case, the external supply voltage is applied on the power supply input node VCC_IN, then the bypass power supply mode is not enabled, and the output voltage VCC_OUT remains zero, for example coupled to the earth by the switch circuit. It will be noted that the slew rate limiter SLR has not remained switched off DIS.

Of course, the case of FIG. 3 corresponds to the setting where the functionality for automatically enabling the bypass power supply mode is enabled, for example by saving BPSS_AUTO_EN_LTCHD at the enabled value "1" in the configuration register RGS.

FIG. 5 illustrates the case where the controller NFC_CTRLR enters the low power mode HIBERN by already being in the bypass power supply mode.

Thus, in the low power mode HIBERN, the external supply voltage is applied on the power supply input node VCC_IN, the switch circuit SWT is in the bypass power supply position BPSS and the slew rate limiter SLR is enabled EN.

If, in this state, the external supply voltage ceases to be applied on the power supply input node VCC_IN, then the bypass power supply mode is automatically disabled, positioning the switch circuit SWT in the off position OFF and the slew rate limiter SLR is disabled DIS.

It has thus been described examples of a technique making it possible to automatically enable/disable the bypass power supply mode, as well as automatically enable/disable the slew rate limiter SLR in the bypass power supply mode to limit the consumption in very low power mode. Furthermore, the software DGTL of the controller NFC_C-TRLR has the option of authorising or not these automatic enabling/disabling functionalities.

In particular, it is not necessary "to wake up" the controller NFC_CTRLR in the active state ACT, or get the software to intervene, in order to perform the management of the power supply according to these two functionalities.

Furthermore, these functionalities are also effective when the NFC controller is forced to the off state, for example by a switch-off signal imposed on an external pin of the integrated circuit. Thus, even if the software of the controller NFC_CTRLR is never enabled during the life of the system SYS, the security peripherals SIM1, SIM2 may be used by the modem MDM.

Moreover, these functionalities are not affected by a hard reset, and do not present the risk of causing a malfunction if applicable.

What is claimed is:

1. An integrated circuit, comprising:
a near field communication controller including a power management circuit configured to:
retransmit an external supply voltage from a power supply input node to a power supply output node in a bypass power supply mode, and
automatically enable the bypass power supply mode in response to the external supply voltage being present at the power supply input node,
wherein the power management circuit comprises:
a configuration register storing configuration data to enable or disable automatic enabling of the bypass power supply mode,
a logic circuit configured to automatically enable the bypass power supply mode based on the presence of external supply voltage and the configuration data stored in the configuration register, and
a slew rate limiter configured to limit a rate of current change at the power supply output node, the power management circuit configured to control a start-up of the slew rate limiter in the bypass power supply mode.

2. The integrated circuit according to claim 1, wherein the power management circuit includes a voltage detection circuit configured to detect the presence of the external supply voltage at the power supply input node.

3. The integrated circuit according to claim 1, wherein the power management circuit is configured to operate independently and automatically in a low power mode of the near field communication controller.

4. The integrated circuit according to claim 1, wherein the power management circuit further includes a voltage generator configured to generate an internal supply voltage at the power supply output node, in an autonomous power supply mode.

5. The integrated circuit according to claim 4, wherein the power management circuit includes a switch circuit having a first input configured to receive the external supply voltage, and a second input configured to receive the internal supply voltage, the switch circuit configured to:

selectively provide the external supply voltage to the power supply output node, in the bypass power supply mode; and
selectively provide the internal supply voltage to the power supply output node, in the autonomous power supply mode.

6. The integrated circuit according to claim 4, wherein the internal supply voltage is regulated at a level configured to power an external peripheral device.

7. The integrated circuit according to claim 1, wherein the integrated circuit is couplable to a security peripheral device that is powered on by a voltage at the power supply output node of the near field communication controller.

8. The integrated circuit according to claim 1, wherein the integrated circuit is couplable to a telecommunications control circuit that provides the external supply voltage to the power supply input node of the near field communication controller.

9. A system, comprising:
a near field communication controller integrated circuit, the near field communication controller integrated circuit including a power management circuit configured to:
retransmit an external supply voltage from a power supply input node to a power supply output node in a bypass power supply mode, and
automatically enable the bypass power supply mode in response to the external supply voltage being present at the power supply input node;
a telecommunications control circuit configured to provide the external supply voltage to the power supply input node of the near field communication controller; and
a security peripheral device configured to be powered on by a voltage at the power supply output node of the near field communication controller,
wherein the power management circuit includes:
a configuration register storing configuration data to enable or disable automatic enabling of the bypass power supply mode,
a logic circuit configured to automatically enable the bypass power supply mode based on the presence of external supply voltage and the configuration data stored in the configuration register, and
a slew rate limiter configured to limit a rate of current change at the power supply output node, the power management circuit configured to control a start-up of the slew rate limiter in the bypass power supply mode.

10. The system according to claim 9, wherein the power management circuit includes a low dropout regulator voltage generator configured to generate an internal supply voltage at the power supply output node in an autonomous power supply mode, the internal supply voltage being regulated to a level configured to power an external peripheral device.

11. The system according to claim 10, wherein the power management circuit includes a switch circuit having a first input configured to receive the external supply voltage, and a second input configured to receive the internal supply voltage, the switch circuit configured to:

selectively provide the external supply voltage to the power supply output node, in the bypass power supply mode; and
selectively provide the internal supply voltage to the power supply output node, in the autonomous power supply mode.

12. The system according to claim 9, wherein the power management circuit includes a voltage detection circuit configured to detect the presence of the external supply voltage at the power supply input node.

13. The system according to claim 9, wherein the power management circuit is configured to operate independently and automatically in a low power mode of the near field communication controller.

14. A method, comprising:
  retransmitting, by a power management circuit of a near field communication controller integrated circuit, an external supply voltage from a power supply input node to a power supply output node in a bypass power supply mode; and
  automatically enabling the bypass power supply mode, by the power management circuit, in response to the external supply voltage being present at the power supply input node
  wherein the automatically enabling the bypass power supply mode includes:
    automatically enabling the bypass power supply mode, by a logic circuit of the power management circuit, based on the presence of the external supply voltage at the power supply input node, and based on configuration data stored in a configuration register of the power management circuit, and
    limiting, by a slew rate limiter, a rate of current change at the power supply output node, a start-up of the slew rate limiter controlled by the power management circuit in the bypass power supply mode.

15. The method according to claim 14, comprising detecting the presence of the external supply voltage at the power supply input node, by a voltage detection circuit of the power management circuit.

16. The method according to claim 14, wherein the method is implemented independently and automatically in a low power mode of the near field communication controller.

17. The method according to claim 14, further comprising generating an internal supply voltage at the power supply output node in an autonomous power supply mode.

18. The method according to claim 17, wherein the power management circuit includes a switch circuit having a first input for receiving the external supply voltage, and a second input for receiving the internal supply voltage, the method further comprising:
  selectively providing, by the switch circuit, the external supply voltage to the power supply output node, in the bypass power supply mode; and
  selectively providing, by the switch circuit, the internal supply voltage to the power supply output node, in the autonomous power supply mode.

19. The method according to claim 14, further comprising:
  providing the external supply voltage to the power supply input node by a telecommunications control circuit; and
  powering on a security peripheral device by the near field communication controller by a voltage at the power supply output node.

20. The method according to claim 14, further comprising powering a security peripheral device by a voltage at the power supply output node of the near field communication controller.

* * * * *